J. E. EMERSON.
Improvement in Attaching Handles to Saws.
No. 128,719. Patented July 9, 1872.
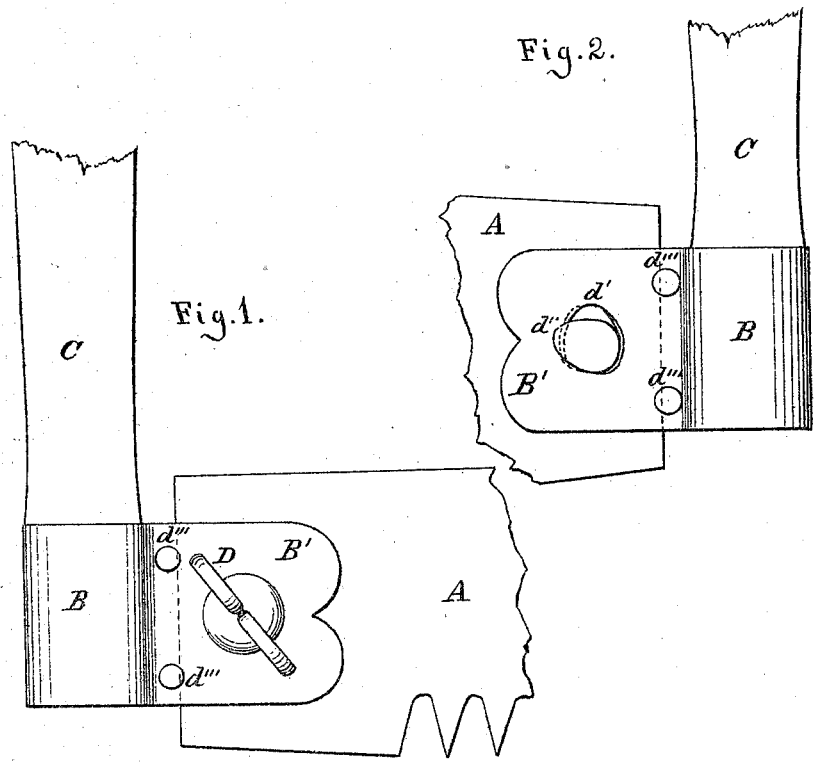
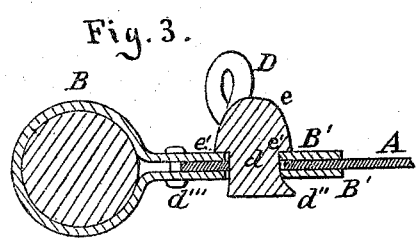
Witnesses:
Inventor:

UNITED STATES PATENT OFFICE.

JAMES E. EMERSON, OF BEAVER FALLS, PENNSYLVANIA.

IMPROVEMENT IN ATTACHING HANDLES TO SAWS.

Specification forming part of Letters Patent No. 128,719, dated July 9, 1872.

I, JAMES E. EMERSON, of Beaver Falls, in the county of Beaver, in the State of Pennsylvania, have invented certain Improvements in Attaching Handles to Saws, of which the following is a specification:

The invention consists in the construction of a thumb cam nut or bolt, which, as it is turned partially around, will force the end of the saw-blade hard against its end bearings, and at the same time will clamp the wings of the socket hard against the sides of the saw-blade.

In the drawing, Figure 1 represents a side view of a section of a saw-blade with the handle clamped to the saw-blade and thumb-cam bolt in place. Fig. 2 represents the opposite side of the same; and Fig. 3 shows the same in transverse section.

A is a section of a saw-blade, having its end at right angles with a central longitudinal line through the saw, with a hole through it at the proper distance from the end. B is the common handle-socket to receive the handle C riveted at $d'''$, which rivets form the end bearings for the saw-blade to abut against. B' B' are the wings that extend from the socket that receives the handle upon each side of the saw-blade, and have holes $d'$ through them. D is an irregular-shaped cam bolt or nut, and made in the form seen in section in Fig. 3, and has the head part $e$, shoulders $e'$, body $d$, and projection or clamping-cam $d''$. The body $d$ of the bolt D is not round, as the radiuses are extended on one side from the axis of the bolt more than on the opposite, which throws the shape from a true circle in cross-section, while the clamping-cam $d''$ is still more extended on about the same radiuses. The body $d$ is a little longer from the shoulders $e'$ than the thickness of the wings B' and saw-plate A in order that the clamping-cam or projection $d''$ may have a hold upon the outside of one of the wings B', as seen in Fig. 3. This projection increases in thickness from the end. As the bolt is turned in one direction it takes hold of and forces that wing of the socket toward the shoulders $e'$ of the thumb-bolt D and clamps the saw-blade A firmly between the wings B', and at the same time the extended or enlarged diameter of the body $d$, in turning, is hard against the side of the hole through the saw-blade toward the end, which forces the saw-blade endwise and against the rivets $d'''$, thus making a solid end bearing for the saw-blade, and at the same time firmly clamping the socket-wings upon the sides of the saw-blade and securely attaching the socket and handle to the saw. Bolt D can go into and through the wings B' and saw-blade A in one way only; consequently no mistake can ever be made in placing it in its proper position; then, by turning it toward the right hand, it will clamp the saw firmly with the wings of the socket.

Having thus described my invention, what I claim, and desire to secure by Letters Patent, is—

The thumb-bolt D, constructed as described, in combination with the wings B' of socket B and saw-blade A, in the manner and for the purpose substantially as described.

JAMES E. EMERSON.

Witnesses:
J. A. LOWNDES,
DANIEL S. PRATT.